United States Patent [19]

Bidegain et al.

[11] 4,395,826

[45] Aug. 2, 1983

[54] APPARATUS FOR DETERMINING A FOOT SIZE

[75] Inventors: Pierre Bidegain, Pau; Georges C. Bidegain, Serres Castets, both of France; Rolf Baumann; Dieter Baumann, both of Leun-Stockhausen, Fed. Rep. of Germany

[73] Assignee: Bidegain S.A., Pau, France

[21] Appl. No.: 238,145

[22] Filed: Feb. 25, 1981

[30] Foreign Application Priority Data

Feb. 25, 1980 [DE] Fed. Rep. of Germany ....... 3006976

[51] Int. Cl.³ .............................................. A43D 1/02
[52] U.S. Cl. ...................................................... 33/3 C
[58] Field of Search ................ 33/3 R, 3 A, 3 B, 3 C, 33/138, 139, 140, 174 D, 179

[56] References Cited

U.S. PATENT DOCUMENTS

| | | | |
|---|---|---|---|
| 587,940 | 8/1897 | De Lisle | 33/179 |
| 812,303 | 2/1906 | Shiverick | 33/3 A |
| 2,636,281 | 4/1953 | Unger | 33/179 |
| 3,432,928 | 3/1969 | Rice | 33/3 B |
| 3,744,140 | 7/1973 | Kyrk | 33/179 |
| 3,967,383 | 7/1976 | Collins | 33/179 |
| 4,164,815 | 8/1979 | Salomon | 33/174 D |
| 4,294,014 | 10/1981 | Baumann et al. | 33/3 C |

FOREIGN PATENT DOCUMENTS

| | | | |
|---|---|---|---|
| 42707 | 3/1888 | Fed. Rep. of Germany | 33/3 B |
| 285273 | 6/1915 | Fed. Rep. of Germany | 33/3 B |
| 123638 | 1/1977 | Fed. Rep. of Germany | . |
| 8918 | of 1887 | United Kingdom | 33/3 C |
| 972577 | 10/1964 | United Kingdom | . |

*Primary Examiner*—Richard R. Stearns
*Attorney, Agent, or Firm*—Darby & Darby

[57] ABSTRACT

An apparatus is disclosed for determining the shoe size corresponding to a foot, the apparatus is of the type including a foot rest adapted to recieve the foot to be measured and a measuring tape extending transverse to the foot rest, which is fixed at a first end relative to the foot rest, forms a loop over the latter, and is movable relative to the foot rest at its second end to tighten the loop about the circumference of the foot to be measured, and a reading point which is fixed relative to said first end of the measuring tape and is arranged opposite markings which are movable together with the second end of the measuring tape. The device is improved by providing additional reading points fixedly associated with the one reading point and a movable chart carrier which is coupled with the second end of said measuring tape and arranged adjacent to all reading points to receive the markings.

28 Claims, 6 Drawing Figures

APPARATUS FOR DETERMINING A FOOT SIZE

The invention concerns an apparatus for determining the foot size corresponding to a foot, particularly that of an infant.

While in the manufacture of custom-made shoes the shoes are fitted as accurately as possible to the shape of the respective foot by transferring practically all length measurements of the foot to the shoe by using a foot cast as a last, it is attempted with ready-made shoes to use as few measurements as possible which are representative of the shape of the foot and the shoe size corresponding thereto.

The essential dimension of the foot is its length, which must be determined in any case, and to which the commercial shoe sizes are fitted. Also important is the determination of the circumference of the foot at the point of the front end of the metatarsal bone, hence obliquely to the longitudinal axis of foot. This dimension is hereafter referred to as "the foot circumference".

In simple ready-made shoes for adults, the foot circumference is mostly neglected, relying on the fact that the shoe will adapt itself to the foot after prolonged wearing. In better ready-made shoes, particularly for children, and especially for infants, consideration of the circumference of the shoe is indispensable. In this case, a second size characterizing the shoe size is associated with each shoe length, which characterizes the circumference of the foot. In order to avoid a confusing variety of designations, it was necessary to limit the number of characteristic sizes for the foot circumference to a few, with the disadvantage that a certain group of foot circumference sizes could no longer be associated definitely with the respective characteristic size, since the length of the foot is indispensable for this purpose. It is readily understandable that a characteristic size for a "mean" foot circumference will refer in a short foot to a different length than is a long foot.

The determination of the foot circumference is of particular importance in shoes for children, and especially for infants. Particularly in the infant, the structure of the foot skeleton is flexible and can easily be shaped by outside influences. An infant, for example, will not feel uncomfortable in a too tight shoe, but this shoe has a shaping effect on the foot of the infant and, in the worst case, causes permanent deformations. In the same manner, a too wide shoe does not provide the necessary lateral support for the foot of the infant. Hence, such a misfitted shoe can cause deformations of the foot.

The manual measurement of the foot circumference is effected with a measuring tape which is placed around the foot in the vicinity of the front end of the metatarsal bone. Such a measurement however, can seldom be carried out with sufficient care in the case of infants, since they sometimes resist such a measurement because they are confused by the unaccustomed surroundings and frightened by the unfamiliar salesman. It must be kept in mind that, because of the flexible foot of the infant, the measurements must be made with great care to avoid measuring errors.

In order to facilitate the measurement, it has been suggested to use an apparatus which consists of a board forming a foot rest to receive the foot to be measured. At the point of measurement, a first end of a measuring tape is secured on the board and formed into a loop over the board. The second end of the measuring tape is passed through a slot in the board, so that the loop can be tightened by pulling at the second end of the measuring tape. The measuring tape carries markings for the measured actual foot circumference, while the slot through which the measuring tape is passed is associated with the board as a fixed reading point.

The foot of the infant is put through the loose loop so that the loop is exactly at the measuring point. Then the loop is tightened, so that the measuring tape surrounds the foot of the infant on all sides without compressing the foot. Then, the mark is read at the reading point.

Independent of this measurement, the length or the size of the foot length is determined. Then the size of the circumference is picked out from a table which corresponds to the measured circumference in correlation with the foot length.

Though the characteristic size of the foot circumference can clearly be determined with the above-described apparatus and by the above-described procedure, this is not readily possible in practice. The salesman must not only take the measurements, he also must remember the value read on the apparatus together with the previously determined length while he removes the foot of the infant from the apparatus, and he must then pick out the size of the circumference, matching these values without making a mistake. During this procedure the salesman must watch the frightened child and answer any questions of the customer, so that memory errors and look-up errors are unavoidable in practice. The salesman is naturally not conscious of these errors, if the final value obtained could conceivably be correct in the experience of the salesman, so that the customer would have no reason to have the measurements repeated. But it was found that the known apparatus led, in practical use, to a considerable tolerance range in determining the characteristic size of the foot circumference, while, as mentioned above, an accurate determination of this characteristic size is particularly important, especially in infants.

In order to simplify the foot measurement, particularly in infants, it has already been suggested in copending application Ser. No. 134,633 filed Mar. 27, 1980, now U.S. Pat. No. 4,294,014, to scan the foot electrically e.g. by optical rays namely at the point of the greatest foot width, which is the point where the foot circumference is also to be measured. Since this foot width is always in a constant relationship to the foot circumference in adults, such a measurement of the width can also be used for the determination of the foot circumference. In the feet of infants, however, a fixed relationship between foot width and foot circumference does not exist. Thus, for example, the width of the foot of an infant changes depending on how much the foot is stressed, hence in dependence on whether the infant is standing or sitting when it puts the foot on the foot rest.

It is conceivable that, by refining the electronic measuring method, not only the width of the foot, but also its height at the measuring point can be determined, so that a more accurate circumference size can be obtained by processing the measured values obtained.

Though this method is possible, such a refined electronic measuring apparatus would be rather complicated and elaborate.

Starting from the above problem, the invention is to be solved in a simple manner to permit a sufficiently accurate determination of the foot size.

This problem is solved according to the invention in that the apparatus of the type mentioned is improved in that additional reading points are fixedly associated with the reading point. Also, a movable chart carrier for receiving the markings is arranged adjacent to all reading points and is coupled with the second end of the measuring tape.

It is thus possible to assign a reading point to each foot length in question, and to arrange the markings on the chart carrier in such a way that when it moves in dependence on the tightening of the measuring tape around the foot to be measured, the respective foot circumference size is clearly associated with the foot size. If the foot length is known, the desired foot circumference size can be read directly during the measurement of the foot circumference; the use of a table with all the inherent error possibilities is thus eliminated.

When the foot of an infant is measured, it is also possible to determine, by tightening the measuring tape more or less, whether inaccuracies which are unavoidable in a measurement, are in the middle of a foot circumference size or at the limits. In the latter case one can make sure, by measuring the other foot, which circumference size is correct. The apparatus according to the invention thus permits measuring not only a single value, but covering a whole measuring range. This is not possible in practice with the known apparatus, because it would then be necessary to remember a great number of measured values which would have to be looked up individually in the table. The invention thus permits rapid and simple measurement of the foot circumference, particularly in infants, with much greater accuracy than was possible heretofore.

It is possible to lead the second end of the measuring tape out of the apparatus as a free end and, in this way, to eliminate errors arising because each person taking the measurements tightens the measuring tape individually. However, in order to simplify the measuring procedure further and thus to eliminate an additional error source, it is suggested according to another feature of the invention to couple a drivable tensioning device with the second end of the measuring tape. Owing to this mechanization, the tensioning process can be made more uniform, so that the reproduceability of the measuring procedure is increased.

In order to simplify the measuring apparatus and to eliminate measuring errors resulting from the coupling between chart carrier and measuring tape, it is suggested according to another feature of the invention, to associate a part of the tension device with the chart carrier. As far as the mechanical coupling with the measuring tape allows for play, this play always assumes a defined limiting value in an effective tensioning device, which value is taken into consideration in the adjustment of the apparatus, so that the play does not impair the measuring accuracy.

According to a particularly simple embodiment of the invention, the tensioning device has a winding drum for the measuring tape which is connected coaxially and integral with a scale roll forming the chart carrier. This particularly simple construction according to the invention permits error-free correlation with the chart carrier, additional error sources being eliminated by the particularly simple mounting for the scale roll. Despite its relatively small dimensions, a scale roll offers a large area for receiving a richly differentiated chart, so that the apparatus according to the invention can be very light and compact. The compact design of the apparatus permits it to be applied effectively to the foot of an infant, even if the infant holds its foot in a manner that makes the measurement difficult, so that any measuring errors resulting therefrom are eliminated.

The compact design, and thus, in the last analysis, the elimination of measuring errors, is enhanced according to another feature of the invention in that a drive is arranged at the end of the scale roll remote of the winding drum, since the otherwise required force-transmitting part between drive and winding drum is formed by the scale roll.

According to another feature of the invention, a transmission gear is arranged between the drive and the scale roll. The driving moment is thus reduced, which permits finely-tuned tightening of the measuring tape and thus enhances accuracy of measurement. The drive is designed particularly as a handwheel, the transmission gear weakening individual operating characteristics of the operator in their effect.

According to another feature of the invention, the tensioning device has an arrangement for limiting the tension in order to further improve the reproduceability of the measuring procedure. If a handwheel is used, flat fillets are provided on the circumference of the handwheel to limit the tension, which are so arranged underneath the cover plate that only one handwheel segment protrudes through a slot in the cover plate. Due to the shape of the circumference of the handwheel, and the partly accessible arrangement of the handwheel, which is embodied as a knurled wheel, only a limited force can be applied on the handwheel by the finger of the operator. This arrangement according to the invention has not only the advantage of a greater constructional simplicity compared to other force-limiting apparatus, such as a sliding clutch, but it has the additional advantage that there is no change in the force-transmission characteristic after prolonged use or non-use, which could falsify the measuring result.

It is principally possible to secure the first end of the measuring tape on the side of the plate forming the foot rest, next to the foot rest, and to pass it downwardly through a slot in the plate on the opposite side of the foot rest.

According to another feature of the invention, the measuring tape is secured with its first end on the side of the foot rest remote of the loop, passed through an oblong slot in the latter for the formation of the loop, and returned again, and then conducted to the coupling point with the chart carrier. The measuring tape thus encloses not only a part of the foot, but the entire circumference of the foot exactly once, and the loop is slightly inclined to the longitudinal axis of the foot. This inclination can be so adjusted by suitable selection of the width of the measuring tape that the circumference of the foot is exactly enclosed at the ends of the metatarsal bone. The apparatus according to the invention thus permits in this embodiment an orthopedically accurate measurement of the relative circumference. The lateral displacement of the incoming and outgoing part of the measuring tape, which is technically unavoidable, is thus kept at a minimum, and is in the vicinity of the foot rest. Since the foot must rest tightly on the foot rest at this point for the measurement, no bending of a metatarsal bone is possible even in an easily deformable foot of an infant (this could lead to an erroneous measurement), since the foot is fully supported by the foot rest at the crossing point of the measuring tape.

In order to ensure reliable guidance of the measuring tape within the mechanical part of the apparatus, it is principally desirable that the latter be rigid. A high inherent ridigity in the range of the loop would also facilitate the opening of the loop before the start of a measurement if a measuring tape of resilient material is used. In order to avoid, particularly in infants, that a relatively rigid measuring tape press into the foot, deform the latter, and thus applies an inaccurate measuring result, it is suggested according to another feature of the invention to make the section of the tape forming the loop thinner than the rest of the tape.

It is principally possible to use a measuring tape which consists of a flexible metal band or a textile-reinforced web material, hence of materials which are normally used for manual measuring tapes. In order to permit a particularly accurate measurement, however, a measuring tape with exactly defined physical properties should be used, which consists thus of a possibly homogenous material with accurate shaping. According to another feature of the invention, it is therefore suggested to make the measuring tape of thermoplastic stretchless plastic, particularly of polyamide, which is known under its commercial name "nylon". Such a thermoplastic plastic permits an economical production of the measuring tape with great accuracy and homogenous structure, so that all measuring tapes produced this way have exactly the same physical properties. Because of the low manufacturing costs it is thus also economically justifiable to replace the measuring tape periodically in measuring apparatus according to the invention, so that damages, as they frequently appear by improper handling or cleaning, do not lead in the long run to false measuring results.

Since tolerances and thus displacements of the measured values can not be completely eliminated at economical costs, it is suggested according to the invention to provide an adjusting device. It would be obvious to associate it directly with the chart carrier in order to correct its position relative to the second end of the measuring tape.

According to another feature of the invention, however, it is suggested to arrange the first end of the measuring tape on the adjusting device, which in turn is secured on the foot rest. The adjusting device thus does not bear on the indicating and tensioning devices associated with the second end of the measuring tape, so that these can be made as uncomplicated as possible, which in turn enhances the measuring accuracy. It is not necessary to tamper with the above-mentioned devices for the adjustment so that damage by clumsy adjustment is avoided.

According to another feature of the invention, the first end of the measuring tape encloses a running nut which is screwed on a threaded adjusting spindle, which is mounted on the foot rest for rotation but not for axial movement. This permits infinite longitudinal adjustment of the measuring tape, and the adjusting device can be arranged inside a housing whose top side forms the foot rest so that accidental shifting of the adjusting device is impossible, while the latter is accessible at any time for readjustment, for example, by means of a hexagon socket wrench or a screwdriver.

For the adjustment, a simple gauge can also be used which represents a certain foot circumference size. After the gauge is inserted and the measuring tape tightened, the adjusting spindle or the adjusting screw is turned until a certain marking on the chart carrier is opposite a certain reading point. This particularly simple adjusting process can readily be carried out periodically by the user of the apparatus to compensate for displacements of the measured values caused by wear. The particularly simple and expedient construction of the adjusting device helps the apparatus according to the invention always to supply relatively accurate measuring values in use.

As mentioned above, the measuring tape must not be pulled too tight around the foot of an infant, otherwise the foot will yield and the measuring result will be false. On the other hand, sufficient tightening is necessary to avoid sagging of the measuring tape, which would also falsify the result. In order to eliminate this tightening problem, it is suggested according to another feature of the invention, to arrange the measuring tape outside the loop at least partly in a guide channel. This guide channel permits simultaneous displacement of the measuring tape from its spaced end in order to widen the loop without it yielding laterally, so that, by inserting and pulling out the second end of the measuring tape, a measurement can be repeated several times rapidly and effortlessly. This is of particular importance in the measurement of an infant's foot since errors of the individual measurement can naturally be compensated by repeated measurements.

If a tensioning device with a winding drum is used, the guide channel extends, according to another feature of the invention, as a ring channel around the circumference of the winding drum, since an annular wall is arranged at a distance from its outer circumference. The distance does not substantially exceed the thickness of the measuring tape at this point. The measuring tape can thus not bend off clear of the winding drum at its fastening point, so that an undefinable tolerance in the measurement is avoided.

Since a certain bending off at the fastening point is unavoidable, the measuring tape would be pressed against the annular wall so that a friction point would be formed there which would impair the unhindered transmission of force between the winding drum and the measuring tape. In order to facilitate the movement of the measuring tape in the ring channel, it is therefore suggested, according to another feature of the invention, to provide the winding drum with a circumference starting from the fastening point for the winding drum and the measuring tape and winding spirally in the direction of the measuring tape. This permits bending off of the measuring tape at the fastening point and effectively prevents friction relative to the annular wall, but the height of the loop always remains defined by the annular wall so that measuring errors, which could be caused by either friction or bending, are avoided.

As mentioned above, the various reading points of the apparatus according to the invention are each associated with a foot length size, which must be determined before the measurement of the foot circumference. In order to avoid memory errors by the operator, the reading points, according to another feature of the invention, have an adjustable signal device which can be formed e.g. by a slide etc. This signal device is adjusted automatically or manually after the measurement of the foot length, and thus reliably prevents a memory error. The reading points can be constructed, e.g. as markings on a fixed housing part and arranged next to the movable chart carrier. In order to avoid reading errors which are still possible in this case, the chart carrier, according to another feature of the invention, is provided with a cover which is stationary relative to the foot rest and which has sight windows forming the reading points. In this case, the signal device can preferably be constructed as a slide which covers all reading points with the exception of the one corresponding to the measured foot length. In order to increase the measuring accuracy, a reading mark can be assigned to each sight window so that errors in reading the value from the chart carriers are impossible. This permits the operator to focus his full attention on the measuring procedure proper, which is particularly difficult in infants as pointed out above, whereby the last-mentioned embodiment of the invention further enhances the accuracy of the measuring results.

If a manually operated knurled disk protruding only partly from a cover plate is used as a tensioning device for the measuring tape, sight windows are preferred into which is introduced a cover plate extended beyond the scale roll, so that the compact design of the apparatus according to the invention is enhanced.

The measurement of the foot length preceding measurement of the circumference can principally be effected outside the apparatus according to the invention. In another embodiment, however, the apparatus is equipped additionally with an arrangement or measuring the foot length, so that only a single apparatus is required for the necessary determination of the correct shoe size for a foot. The arrangement for measuring the foot length can be associated preferably with the first foot rest for the measurement of the foot circumference in order to shorten the total measuring procedure. However, it is of particular advantage for the invention to provide a second foot rest for the measurement of the circumference and to equip it with a fixed and strop for the foot. This greatly simplifies the measurement of the foot length, which helps further to reduce measuring errors. A contact-free electronic arrangement for measuring the foot length, as mentioned above, is particularly suitable for accomodation in the apparatus according to the invention and for control of the signal device.

The signal device preferably has light-emitting diodes which either directly form the reading points or are assigned individually in a one-to-one relationship to the reading points. Such a light-emitting diode is preferably arranged next to the sight window under which the panel of the chart containing the measuring result is visible after completion of the measurement of the foot circumference. Such an apparatus is so simple in its operation that operating and reading errors are substantially eliminated.

According to a preferred embodiment of the invention, the electronic arrangement for measuring the foot length has juxtaposed pairs of radiation sources-receiving units in the direction of successive raster points for measuring the foot length, and the individual pairs of associated radiation sources and receiving units oppose each other relative to the foot rest. The extent of the radiating areas, of the areas of the radiation sources and of the receiving units responding to the radiation is so selected that it is less than or equal to the spacing between directly adjoining raster points for the longitudinal measurement in the direction of successive measuring raster points. At the same time, each radiation source and one of the receiving units are associated in a one-to-one (inversely unique, injective) correlation, at least within adjacent pairs of radiation sources/receiving units. The distance between two raster points for longitudinal measurements corresponds here to the distance between two shoe length intervals.

The above-described features lead to a high measuring accuracy with a comparatively simple construction, and the measurements are furthermore taken automatically. In particular, the above-described features increase the measuring accuracy compared to other known foot measuring apparatus, e.g. the foot measuring apparatus for determining a shoe size known from U.S. Pat. Nos. 3,328,882; 3,457,647 or British Pat. No. 1,489,181. The above-described limitation of the radiating and receiving areas of the pairs of radiation sources/receiving units to the distance of directly adjoining raster points for length measurements and the one-to-one relationship of radiation sources and receiving units associated in pairs regarding the transmitted signal, has the result that the geometric-optical measuring errors found in the known foot measuring apparatus are completely absent in the measuring apparatus according to the invention. In the known apparatus, errors result because several receiving units receive radiation from a single radiation source, due to the divergence of the radiation within the radiation plane. There is thus no unique relationship between the radiation source and the receiving units. This may result in an apparent increase or decrease of the foot length. This error is completely eliminated by the one-to-one correlation between the radiation sources and receiving units according to the invention.

Furthermore, measurement inaccuracies of the known foot-measuring apparatus resulting from the wave nature of the radiation are practically completely eliminated. According to Huygen's principle, any point of a wave area can be considered the starting point of a spherical or circular wave. Any obstacle in the path of the wave propagation leads thus to a diffraction, and thus to a deviation from the rectilinear radiation course. They lead therefore to diffraction phenomena which in the known foot-measuring apparatus permit no unique relationship between the radiation sources and the receiving units. The diffraction phenomena—just as the above-mentioned geometric-optical measuring errors—result in an apparent increase or reduction of the foot length. This leads to false readings, the error depending again on the shape of the respective foot, but particularly on whether the left or right food is measured, because one of the two feet is always farther away from the radiation sources than the other. The foregoing feature according to the preferred embodiment, however, prevents pairs of directly adjoining radiation sources/receiving units from influencing each other, thus avoiding systematic measuring errors. With the preferred embodiment it is thus possible to realize an arrangement with individual clearly distinguishable signal barriers in the raster of the available shoe sizes.

For marking the reading points, the outputs of the receiving units are preferably connected with light emitting diodes provided at the reading points. This results in an automatic correct marking of the reading point at which the chart carrier is to be read.

The radiation sources are realized by radiation-emitting diodes and the receiving units by phototransistors. Such electronic units are characterized by great simplicity and particularly good controllability, and thus measuring accuracy.

According to a particularly preferred embodiment, the one-to-one correlation between the radiation sources and the receiving units is achieved by providing a time division multiplex circuit which drives at least pairs of directly adjoining radiation sources/receiving units (in pairs) successively. This measure ensures that pairs of directly adjoining radiation sources/receiving units can not transmit rays and signals simultaneously. Interaction between the signals of pairs of adjacent radiation sources/receiving units is thus impossible.

In order to be able to determine, within pairs of radiation sources/receiving units, between which pair the measuring signal required for the determination of the necessary shoe size has been transmitted, two exclusive-OR-elements are preferably arranged following each receiving unit, in such a way that the receiving unit controls exactly one input of each of the two exclusive-OR-elements, and the other two inputs of the two exclusive-OR-elements are controlled by the other two receiving units arranged on either side of the receiving unit. This connection ensures, in a simple manner, that exactly that pair of radiation sources/receiving units can be determined which lies at the threshold between the zone shaded by the foot and the zone not shaded by the foot. The selectivity between the pairs of radiation sources/receiving units is further increased by a threshold switch preceding each exclusive-OR-element, and an integrator preceding the latter. In this way, interference particularly by outside light, is practically completely eliminated.

A further increase in the suppression of interference is achieved by a time switch which keeps the time division multiplex circuit in operation until it has driven each pair of radiation sources/receiving units a given number of times, this number being greater than 2. Furthermore, a resistor is connected in parallel to the integrator which has resistance value so tuned to the time switch that the integrator produces a signal exceeding a threshold value only when it receives the given number of pulses.

The time division multiplex circuit comprises a timing oscillator and a counter following the latter with at least two successively emitted outputs, where the two control outputs for the radiation source and for the receiving unit of an associated pair of radiation sources/receiving units are connected to the same counter output and the control inputs of directly adjoining pairs of radiation sources/receiving units to different counter outputs. Preferably the counter outputs are in one-to-one correlation with the pairs of radiation sources/receiving units, that is, to each counter output is assigned exactly one pair of radiation sources/receiving units, and to each pair of radiation sources/receiving units only this one counter output.

According to the above-described preferred embodiment of the invention, a particularly sharp channel separation is ensured by the time-division multiplex operation, and a particularly great freedom from interference by the threshold switch with the preceding integrator and following exclusive-OR-element.

For a further description of the arrangement for the electronic foot length measurement we refer explicitly to U.S. Pat. No. 4,294,014 of the same applicant, the disclosure of which is hereby incorporated by reference.

The subject of the invention will now be described by way of example on the basis of the attached drawing.

Figure 1:
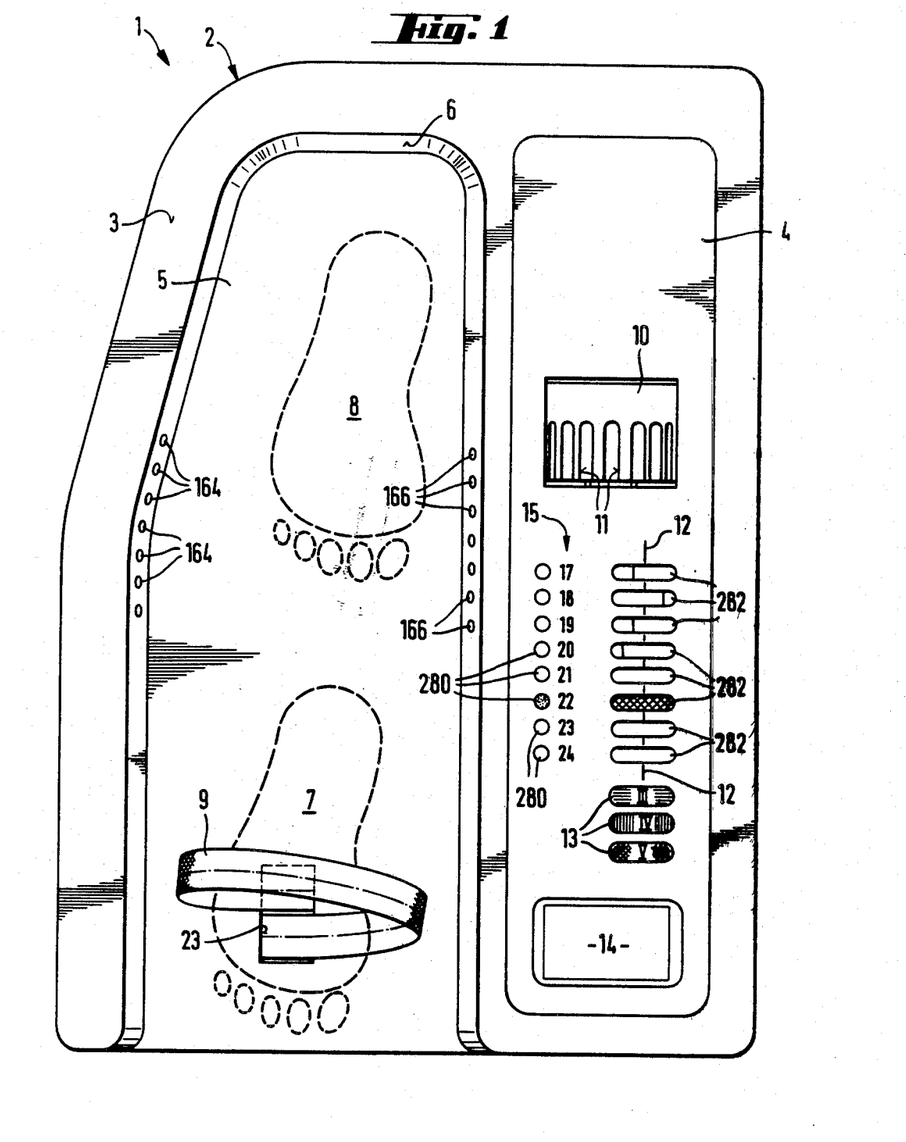
FIG. 1 shows a top view of a foot-measuring apparatus according to the invention.

FIG. 1 shows a top view of a preferred embodiment of a measuring apparatus 1 according to the invention, which has a flat housing 2 whose front wall, back wall and right-hand side wall meet in a right angle (according to the representation), while the left-hand side wall extends in its front half parallel to the right-hand side wall and is bevelled in its rear half toward the right-hand side wall, so that the entire housing tapers toward the rear. All edges are rounded off to avoid measuring apparatus 1 from injuring a foot to be measured.

Housing 2 has a flat of side 3 which forms a cover plate 4 in the right half and has in its left half a depression tapering toward the rear, which is open toward the front of housing 2. The rear boundary wall of the depression forms a bearing surface 6.

The bottom of the depression is formed by a plane bottom plate 5. Housing top side 3, cover plate 4 and bottom plate 5 form a one-part upper housing part.

At the front end of the depression, bottom plate 5 forms a first foot rest 7, indicated by broken lines, while bottom plate 5 has a second foot rest 8 at its rear end, bonded by bearing surface 6.

On the first foot rest 7 is arranged a measuring tape 9, which forms a loop starting from bottom plate 5 and returning to the latter. As can be seen from the oenter line in FIG. 2, measuring tape 9 is so arranged that the loop formed by it encloses the foot on foot rest 7 exactly at the point at which the metatarsal bones end. This point of a foot is determinant for the measurement of the circumference. The measuring tape will be described more fully below in connection with FIG. 3.

Cover plate 4 has a recess through which protrudes a knurled head 10 arranged inside housing 2 with a portion extending above housing top side 3. Knurled head 10 is aligned with its longitudinal axis parallel to the longitudinal direction of measuring apparatus 1 and is mounted for rotation about this longitudinal axis. (The mounting in housing 2 has been omitted for clarity's sake).

Figure 3:
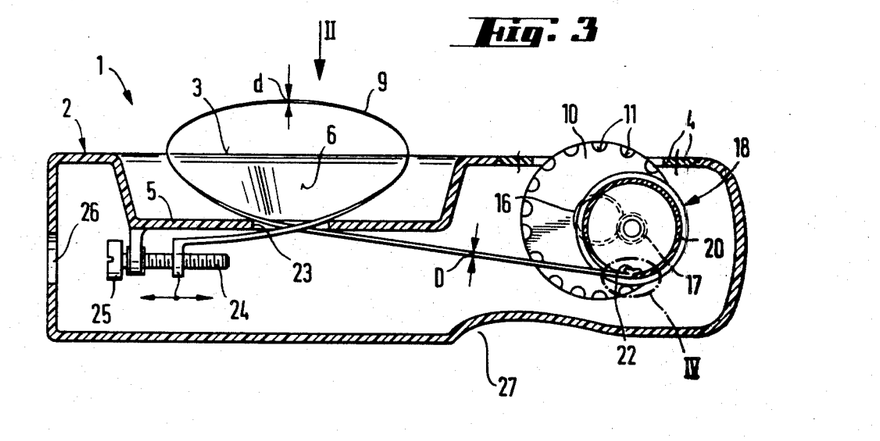
FIG. 3 shows a section along line III—III in FIG. 2.

As it can be seen from FIG. 3, knurled head 10 protrudes only slightly from cover plate 4 and is also provided on its circumference with flat longitudinal grooves 11 so that, when knurled head 10 is turned by hand, only a relatively small, limited circumferential force can be applied on the latter.

Cover plate 4 also has eight sight windows 282, which are transverse to the longitudinal axis of housing 2 and are arranged in succession along a reading line 12 which is arranged visibly on cover plate 4 and extends parallel to the axis of knurled head 10, but is displaced toward the right housing side relative to the latter.

In front of sight windows 282, aligned with the latter, and shaped like the latter, are arranged three color panels 13 with different colors, which each carry a mark for a different circumference size of an infant's foot.

Figure 5:
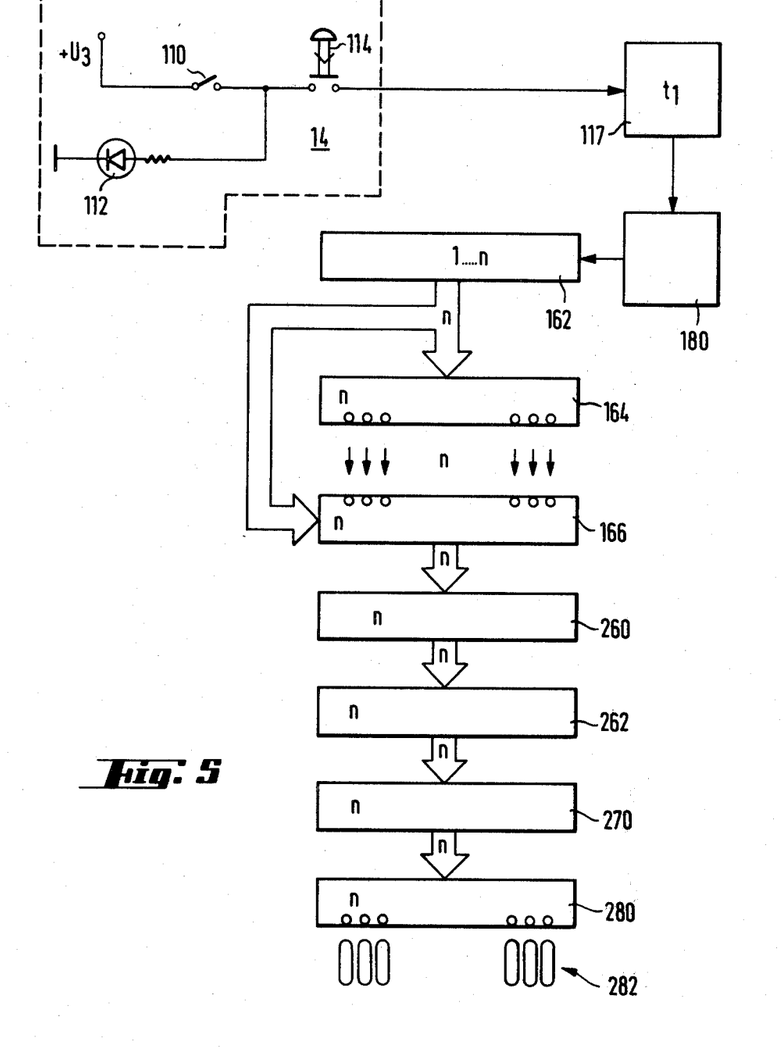
FIG. 5 shows a circuit block diagram of an embodiment for an arrangement for the electronic measurement of the foot length with integrating time-division multiplex operation.

On the face of cover plate 4 is arranged an operation panel 14 which serves to receive main switch, battery control etc. (FIG. 5). To the left next to each sight window 282 is provided a numbers panel 15 with a code number for each foot length size (in the present case foot length sizes for infants).

Each sight window 282, the respective numbers panel 15, and the respective LED 280 are aligned with each other in the longitudinal direction of the sight window, the width of sight windows 282, measured in the longitudinal direction of housing 2, as well as their distance from each other being so selected that a one-to-one correlation can always be readily established between an LED 280, an index on numbers panel 15 and the respective sight window 282.

Figure 2:
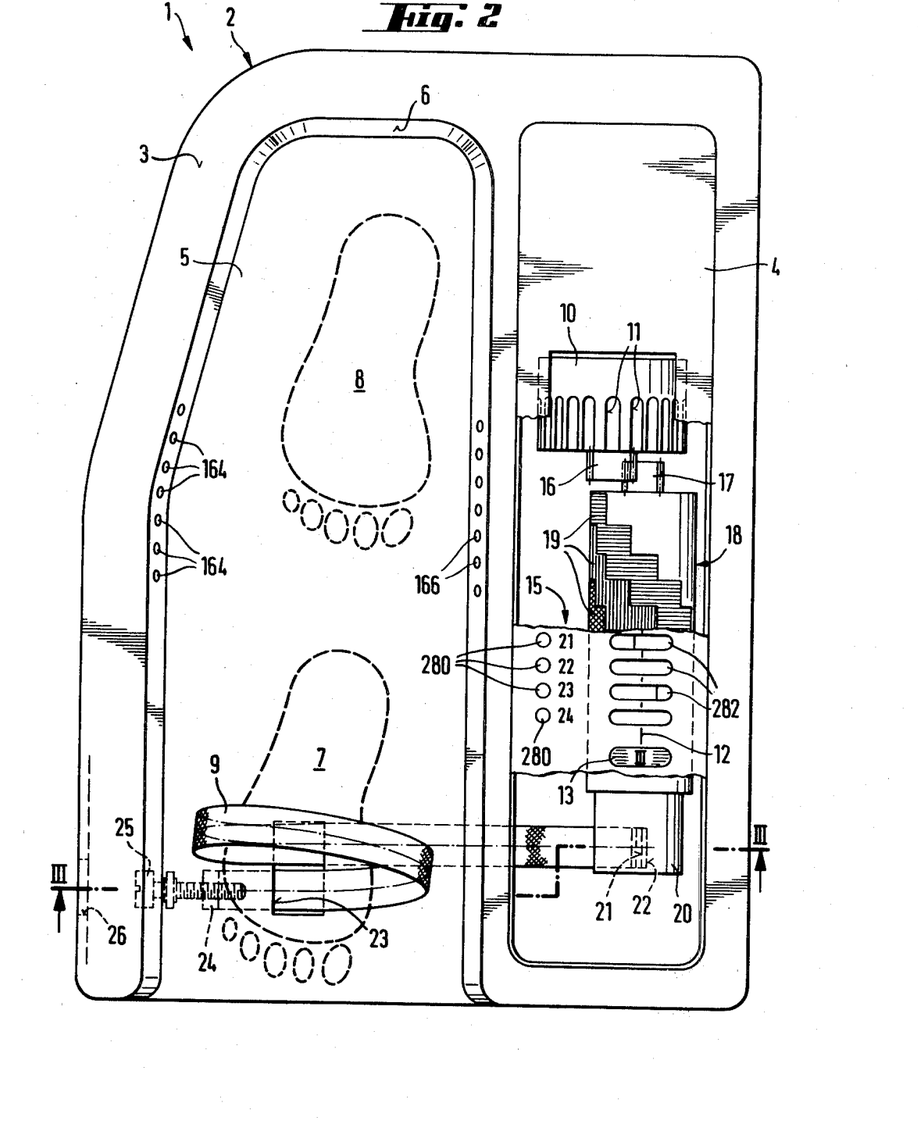
FIG. 2 shows a representation similar to FIG. 1, but with the cover plate shown partly broken away.

As can be seen from FIG. 2, a gear wheel 16 is mounted on the face of knurled head 10, which meshes with a smaller pinion 17 provided on a scale roll 18 arranged to have an axis of rotation parallel to that of knurled head 10. The center axis of scale roll 18 is exactly underneath reading line 12, which forms the common center line of all sight windows 282.

The circumference of scale roll 18 carries color zones 19 separated by graded lines, whose colors, following each other in the longitudinal direction of scale roll 18, are identical with the colors of color panel 13 following each other in this direction. As can be seen from FIG. 1, color zones 19 and their mutual boundaries can be seen through sight windows 282, and depending on whether such a boundary is to the right or left of reading line 12, it can be determined whether the measured foot must be correlated with a circumference size which must be assigned to one or the other color of color zones 19. As can be seen, the respective foot length and foot circumference can readily be read with scale roll 18 and the LED 280 lighting up.

On the end face of scale roll 18 facing the front of housing 2 is molded a winding drum 20 with a somewhat smaller circumference, which has on its circumference a slot 21 in which the second end 22 of measuring tape 9 is engaged. The circumference of winding drum 20 is surrounded at a distance from the latter which corresponds substantially to the thickness of measuring tape 9, by an annular wall which has been left out in the drawing for simplicity's sake, as has the mounting of the winding drum.

Figure 4:
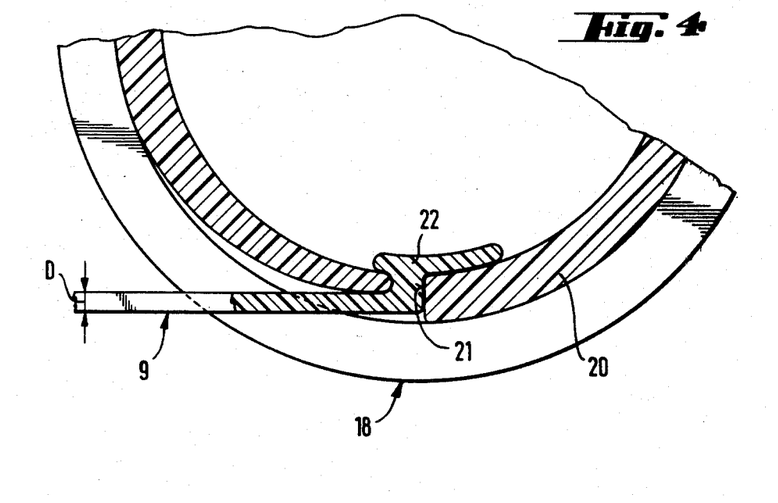
FIG. 4 shows a view of a detail IV of FIG. 3 on an enlarged scale.

As can be seen from FIG. 4, the second end 22 of measuring tape 9 is constructed as a crank attached in a right angle on the latter, and is so provided with roundings fitting the foundings of slot 22 in the winding drum, that breaking off of measuring tape 9 during the winding is substantially avoided. In order to facilitate the guidance of measuring tape 9 between the outer circumference of winding drum 20 and the annular wall, not shown here, winding drum 20 has a reduced wall thickness on the side of slot 21 facing measuring tape 9, whose outer contour expands outwardly into the outer circumference. For additional details we refer explicitly to the detailed representation in FIG. 4.

As can be seen from FIG. 3, bottom plate 5 has a slot 23 through which measuring tape 9 is passed from winding drum 20 and from the underside of top bottom plate 5 thereabove, then it is returned again, forming a loop, and is returned through a slot 23 to the underside of bottom plate 5, forming there the first end. The section of measuring tape 9 facing the first end is passed through the front part of slot 23, while the section facing the first end is passed through the the second end is passed through the rear part of slot 23 facing the second foot rest 8. This results in the required inclined position of the loop of measuring tape 9, as can be seen from FIG. 2.

As can furthermore be seen from FIG. 3, thickness of measuring tape 9 is much less in the range of the loop formed above bottom plate 5 than thickness D of the end sections of measuring tape 9.

At the first end of measuring tape 9 is arranged a mount perpendicularly to the latter for receiving a threaded part, e.g. a screw nut, though which extends an adjusting screw 25, which is arranged coaxially to the first end of the measuring tape and is fixed axially relative to housing 2, but can rotate freely. For simplicity's sake, the fastening point in FIG. 3 is only indicated schematically.

An opening 26 in the left side wall of housing 21 is so aligned with adjusting screw 25 that it is accessible by means of a tool introduced through opening 26 for adjusting the length of measuring tape 9.

The underside of housing 2 has a plane base parallel to top side 3 in which is provided a depression 27 which permits gripping housing 2 with one hand in such a way that the thumb can readily actuate knurled head 10.

Housing 2 is divided at about the level of opening 26, but this division is not shown to facilitate the understanding.

All sections of measuring tape 9 arranged inside housing 2 are guided in a channel whose top—and underside are formed by the two halves of the housing. This channel is not represented in the drawing.

Housing 2 also contains all electrical and electronic elements and parts which are necessary for the operation of the foot length-measuring device on the second foot rest 8. FIG. 1 shows the condition of the apparatus after the measuring procedure: LED 280 corresponding to foot length "22" in numbers panel 15 lights up, and in the adjacent sight window 282 we can see the colo zone whose color corresponds to the size of the circumference (one line cut off).

FIG. 5 shows a block circuit diagram of an embodiment for an electronic length measuring arrangement with integrating time division multiplex operation. In this embodiment an operating switch 110 is provided as an ON/OFF switch. An LED 112 indicates that the measuring apparatus is ready. Connected in series with operating switch 110 is a start key 114. Start key 114 is only pressed when the foot is in the proper position for the length measurements. When the start key is pressed, a timing circuit 117 is actuated which controls a following timing oscillator 180 for a given period t1, that is, it supplies it with operating voltage. Timing oscillator 180 acts on a counter 182, and the time period t1 is so selected that the counter full count is traversed at least 2 times.

Counter 162 has n outputs which control individual measuring channels successively, each measuring channel having on the input side one light barrier which consists of a pair of radiation sources/receiving units 164, 166. All the measuring channels are identical and a representative one is illustrated in FIG. 6.

According to FIG. 5, n integrators, 260, n threshold switches 262, and n exclusive-OR gates 270 are arranged following the n light barriers formed of n pairs of radiation sources/receiving units. Each of the n exclusive-OR gates 270 controls exactly one of the n LED's 280, and the LED's are arranged next to reading points 282. In FIG. 5, the reading points 282 for reading the chart carrier 18 (FIGS. 1,2) are indicated at the right next to LED's 280.

The above-mentioned elements are connected in series in the direction of the signal flux, this direction being symbolized by the thick arrows, the letter n entered in the thick arrows indicating the number of light barriers formed by the pairs of radiation sources/receiving units 164, 166, and thus the number of measuring channels.

Figure 6:
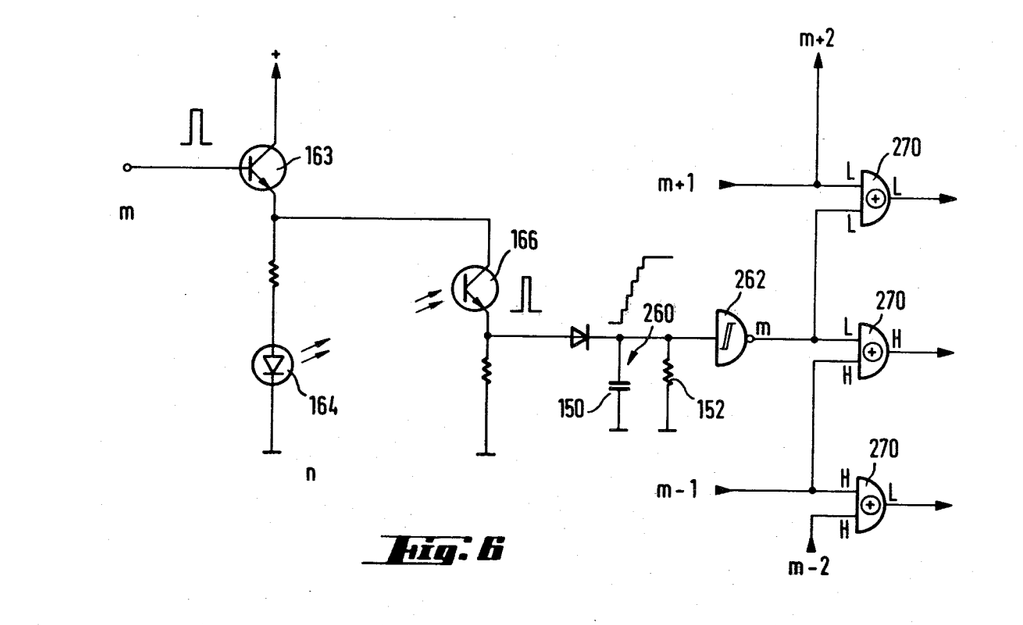
FIG. 6 shows a principal circuit diagram of a single multiplexed measuring channel defined by a pair of radiation sources/receiving units.

FIG. 6 shows the principal circuit diagram of a single measuring channel. According to FIG. 6, each of the n counter outputs controls emitter-follower switching transistor 163 whose output is connected at the same time to the positive terminal of radiation source 164, for example an LED, and to the collector of the receiving unit 166, realized by an npn-phototransistor. The radiation given off by LED 164 strikes the base of phototransistor 166 and controls the latter. The emitter of phototransistor 164 is grounded through a load resistor. The signal obtained with this circuit can be used directly for controlling the LED's 280 arranged next to reading points 282.

The circuit described above works as follows: Counter 162 counts the timing pulses of timing oscillator 180. Each individual output 1 to n of counter 162 controls exactly one of the n measuring channels or light barriers including radiation sources 164 and receiving units 166. The light barriers are thus in operation as long as a counter output is activated. Since each counter output activates exactly one measuring channel, there is a one-to-one correlation between the counter outputs and the measuring channels. Due to this one-to-one correlation, the light barriers or measuring channels are put in operation one after the other in the order of the counter outputs, namely in the direction from the smallest to the greatest foot length and the associated shoe length, respectively. This ensures that only one pair of radiation sources/receiving units 164, 166, is activated for the measurement of the foot length, while the others remain out of service. At the first light barrier not interrupted by the foot,—it is assumed that the heel of the foot bears on a fixed stop on foot rest 8—a positive signal is formed at the emitter of phototransistor 166. This signal can now be used for conrolling directly the LED's (28) provided next to reading points 282, each measuring channel being again correlated with a LED 280 on a one-to-one basis. Since the measuring channels are started successively in the direction of increasing foot length, and LED's 280 are arranged in the same order, all those LED's will light up in a simplified representation of the embodiment which are associated with the light barriers or measuring channels no longer interrupted by the foot. The first LED 280 lighting up in the direction of rising foot length-measuring raster points represents thus the required shoe length. Naturally LED's 280 can also be controlled that all the LED's light up which are associated with the light barriers interrupted by the foot, while all other LED's remain dark.

In the simplified representation of the circuit, the reading is thus marked by the fact that the first lighted or first dark LED in rising measuring raster point order is at this point.

According to FIGS. 5 and 6, an integrator 260 with following threshold switch 262 is arranged in each of the n measuring channels, following each light barrier formed of a pair of radiation sources/receiving units 164, 166. The pulses emitted by phototransistor 166 are integrated in integrator 260 to a staircase voltage, assuming that all light barriers are traversed at least twice for the measurement of a foot length. With only two passages, the "staircase" of the staircase voltage has exactly two steps. The following threshold switch 262 is constructed e.g. as a Schmitt trigger. Integrator 260 comprises a capacitor 150 and a resistor 152 connected in parallel to capacitor 150. One terminal of capacitor 150 and of resistor 152 is grounded. The other terminals are connected through a diode to the output of phototransistor 166. Resistor 152 is so selected in value that the output signal of integrator 260 crosses the trigger threshold of the Schmitt trigger, that is, threshold switch 262, when it receives all radiation pulses given off by radiation source 164 arranged inside the measuring channel during one measurement. Due to this feature, spurious signals, particularly from outside light, are suppressed. This feature thus serves to increase the measuring accuracy further.

Another increase of the measuring accuracy of avoiding reading errors is achieved by the exclusive-OR gate 270 which are arranged following the measuring channels according to FIGS. 5 and 6. One exclusive-OR gate 270 is arranged following each measuring channel.

The threshold switch 262 is constructed so that its output assumes zero potential when the trigger threshold is crossed. This potential arrives at the following exclusive-OR gates 270.

The exclusive-OR gates 270 are so arranged following each threshold switch 262 that the output of one threshold switch 262 controls one input of two adjacent exclusive-OR gates 270, and the other inputs of these two exclusive-OR gates 270 are controlled by the two threshold switches 262 arranged at either side of threshold switch 262.

If we start with the assumption that channel m, represented in FIG. 6, is the first channel whose light barrier is not interrupted by the foot, we have the following constellations at the exclusive-OR gates.

All channels m-1, m-2, etc. below this channel, whose light barriers are interrupted by the foot, have positive potential at the output of their threshold switches 262. Thus a positive potential appears likewise at the two inputs of the two following exclusive-OR gates 270. The output of these exclusive-OR gates 270 thus have zero potential. All channels m+1, m+2 etc. above this channel in the direction of rising measuring raster points have zero potential at the output of their threshold switches 262, which appears at the two inputs of the following exclusive-OR gates 270. Only the exclusive OR gate 27 degrees of measuring channel m represented here, hence the first channel whose light barrier is not interrupted, has different potentials at its two inputs, and thus positive potential at its output. The represented circuit thus ensures that only one exclusive-OR gate 270 has positive potential at its output at all times; all other exclusive-OR gates 270 having zero potential at their output. The exclusive-OR gate 270 having positive potential at its output corresponds exactly to the first light barrier which is not interrupted by the foot.

The exclusive-OR gates 270 are arranged successively in the direction of rising foot length measuring raster points and are correlated at the same time, on a one-to-one basis, with LED 280 arranged likewise in the direction of rising foot length-measuring raster points. This ensures that only one LED 280 lights up in a measurement of the foot length, namely the one which corresponds to the shoe length correlated with the foot length.

Overall, the one-to-one correlation between radiation sources 164 and receiving units 166 regarding the radiation transmitted between them is ensured in the last described measuring arrangement as a result of the successive excitation of the pairs of radiation sources/receiving units 164, 166 in time division multiplex operation. In this manner, the geometric-optical and waveoptical measuring errors appearing in the known apparatus mentioned in the specification are at least substantially eliminated. The circuit following the light barrier, which consists of integrator 260 and threshold switch 262, serves to suppress spurious signals, particularly those caused by outside light. It thus leads, corresponding to the object of the invention, to a further increase of the measuring accuracy. The exclusive-OR gates 270 provided at the end of each measuring channel, including their connection with the other circuit parts of the measuring channel, serve to make sure that the first measuring channel in the direction of rising measuring raster points, whose light barrier is not interrupted by the foot, stands out clearly from the other measuring channels. This feature too, in connection with the linkage between the exclusive-OR gates 270 and LED's 280, leads to a further increase of the measuring accuracy, corresponding to the purpose of the invention.

The electronic measurement of the foot length by means of light barriers arranged in the direction of successive measuring raster points, whose radiation sources and receiving units are correlated with each other on a one-to-one basis, has the further advantage that the measurement of foot length can be effected simultaneously with the above-described measurement of the foot circumference, because in the electronic circuit it is not necessary that one end of the foot, as a rule the heel, bear on a fixed step. Rather, the present circuit shows that a high output potential appears at one of the two exclusive-OR gates whenever different potentials appear at the outputs of two juxtaposed measuring channels or light barriers and an associated exclusive OR gate. Accordingly, the locations of both ends of a foot, that is, toes and heel, can be clearly measured with the above-described circuit by the change between light barriers interrupted by the foot and light barriers not interrupted by the foot. Uniquely correlated with the foot, and thus the shoe length, is the number of exclusive-OR gates which are arranged between the two exclusive OR gates with high output potential. This number can be determine-electronically by a known counting circuit or differential circuit. In such a circuit, the outputs of the exclusive-OR gates are not connected directly to the LED's 280, but to the counting or differential circuit.

The output of this differential circuit controls then the LED corresponding to the foot length. Though the last described circuit has the advantage that the measurement of the foot length can be effected simultaneously with the measurement of the foot circumference, it is characterized relative to the above-described circuit by a disadvantage in that more light barriers must be provided, because in a circuit where one end of the foot, e.g. the heel, bears on a fixed step, light barriers are only required in the toe or ball region of the foot. Besides, the light barriers can be spaced here from each other at a distance which is equal to the distance between two shoe lengths. But in a measurement of the foot length where the measuring for the heel is not fixed, the distance between the light barriers must be smaller than the distance between two immediately following shoe lengths.

Although preferred forms of the invention have been disclosed for illustrative purposes, those skilled in the art will appreciate that many additions, modifications and substitutions can be made without departing from the scope and spirit of the invention as defined in the accompanying claims:

What is claimed is:

1. In an apparatus for determining a shoe size corresponding to a human foot, said apparatus including an elongated foot rest adapted to receive the foot to be measured; an arrangement for foot length measurement having a measuring output; a measuring tape extending transverse to the foot rest, which is fixed at a first end relative to the foot rest and movable relative to the foot rest at its second end to tighten the tape about the circumference of the foot to be measured; a movable chart carrier which is provided with a pattern of markings and is coupled with said second end of said measuring tape for jointly moving said pattern of markings with said second end of said measuring tape; a reading region for reading the circumference of the foot to be measured, which is fixed relative to said first end of the measuring tape and is arranged opposite said pattern of markings; the improvement comprising:

said measuring tape being constructed and positioned to form a loop about the ball region of the foot to be measured;

said reading region including a plurality of spaced apart reading points corresponding to shoe lengths, all of them being positioned opposite said pattern of markings;

said pattern of markings comprising different marking elements, the number of which being at least equal to the number of shoe width sizes defined for at least each shoe length and being representative thereof; and each reading point having associated therewith a controllable signaling means, having a control input connected to the measuring output of said foot length measuring arrangement.

2. Apparatus according to claim 1, further comprising movable tensioning means coupled with said second end of said measuring tape for adjusting the size of said loop.

3. Apparatus according to claim 2, further comprising a part of said tensioning means being mechanically coupled with said chart carrier.

4. Apparatus according to claim 3, further comprising a winding drum on said tensioning means for said measuring tape, which is connected and is integral with a scale roll forming the chart carrier.

5. Apparatus according to claim 4, further comprising a drive arranged at the end of said scale roll remote from the winding drum.

6. Apparatus according to claim 5, further comprising a transmission means coupled between the drive and the scale roll, the drive being a handwheel.

7. Apparatus according to claim 6, further comprising means in said tensioning means for limiting the tension, a cover on said apparatus having an opening therein, said tension limiting means including fillets on said handwheel, said handwheel being mounted below said cover plate so as to protrude through said opening thereabove.

8. Apparatus according to any one of the claims 1 to 7, wherein the measuring tape is secured with its first end under the foot rest and remote of the loop, is passed upwardly through a slot the foot rest for the formation of the loop and back down again, and extends then toward a coupling point with the chart carrier.

9. Apparatus according to claim 8, wherein the portion of the measuring tape forming said loop is thinner than the other portions thereof.

10. Apparatus according to claim 9, wherein the measuring tape consists of thermoplastic stretchless plastic.

11. Apparatus according to claim 8, wherein the first end of the measuring tape is arranged on an adjusting device which is secured on the foot rest.

12. Apparatus according to claim 11, further comprising a running nut at the first end of the measuring tape and an adjusting spindle mounted on the foot rest for rotation but not for axial movement, said running nut being screwed on said spindle.

13. Apparatus according to claim 8, further comprising a guide channel having at least one wall extending below the foot rest, parallel to the sides of the measuring tape and arranged adjacent thereto, said tape extending through said channel over at least a portion thereof.

14. Apparatus according to claim 13, wherein the guide channel has a ring channel which is defined by an annular wall surrounding the winding drum at a distance.

15. Apparatus according to claim 14, wherein to facilitate the movement of the measuring tape in the ring channel, the winding drum comprises a circumference spirally widening from the attachment point between the winding drum and measuring tape in the direction thereof.

16. Apparatus according to claim 1, further comprising, over the chart carrier, a cover with sight windows which form reading points.

17. Apparatus according to claim 1, further comprising additional electronic means for foot length measurement which activates the signaling means.

18. Apparatus according to claim 17, wherein the signaling device comprises light-emitting diodes correlated with the reading points in a one-to-one relationship.

19. Apparatus according to either claim 17 or claim 18, wherein the arrangement for the electronic measurement of the foot length comprises:
juxtaposed pairs of radiation sources and receiving units in the direction of successive raster points for measuring the foot length;
the extent of the areas of the radiation sources and of the receiving units in the direction of successive measuring raster points being less than or equal to the distance of directly adjoining measuring raster points; and
the radiation sources and receiving units, at least within directly adjoining pairs of radiation sources/receiving units, are association with each other, on the basis of the signal to be transmitted between them, in a one-to-one correlation.

20. Apparatus according to claim 19, wherein the outputs of the receiving units are connected to the radiation sources.

21. Apparatus according to claim 20, wherein the radiation sources are light-emitting diodes and the receiving units phototransistors.

22. Apparatus according to claim 19, further comprising a time division multiplex circuit connected to successively drive at least directly adjoining radiation sources/receiving units.

23. Apparatus according to claim 22, comprising two exclusive OR gates connected following each receiving unit so that the receiving unit controls exactly one input of each exclusive OR gate and the other two inputs thereto are controlled by receiving units arranged at either side of said each receiving unit, and an integrator followed by a threshold switch connected between each receiving unit and each exclusive OR gate.

24. Apparatus according to claim 23, further comprising a time switch means for activating the time division multiplex circuit into an operating state until it has driven a predetermined integral plane number, each pair of radiation sources and receiving unit of time, and in each integrator being constructed to emit a signal exceeding a predefined threshold value when its corresponding radiation source or receiving unit pair has been driven said integral number of times.

25. Apparatus for determining the shoe size corresponding to a human foot, comprising:
means for measuring the length of said foot, including means for indicating the corresponding shoe length size;
means for measuring the circumference of said foot;
a chart having a first coordinate representing measured foot length, a second coordinate representing measured foot circumference, and a pattern of markings including marking elements identifying each of a plurality of different predefined shoe width sizes, each point on said chart being defined by the concurrence of a foot length coordinate value and a foot circumference coordinate value, said pattern encoding each such point with marking elements identifying the shoe width size corresponding to said concurring coordinate values;
means coupled to said foot length measuring means for indicating the foot length coordinate value corresponding to the measured foot length; and
means coupled to said foot circumference measuring means for indicating the foot circumference coordinate value corresponding to the measured foot circumference, the marking element appearing at the point representing the concurrence of the indicated length and circumference coordinate values representing the shoe width size of said foot.

26. Apparatus in accordance with claim 25 wherein said circumference measuring means comprises tape means for encircling said foot in the region of the ball thereof, said tape means having a first end which is fixed with respect to said foot during the circumference measurement and a second end which is movable with respect to said foot in relationship to its circumference, said second end being coupled to said means for indicating the foot circumference coordinate value.

27. Apparatus in accordance with claim 26 wherein said chart is represented in rectangular coordinates, said circumference coordinate indicating means comprising a chart carrier having a substantially cylindrical surface on which said chart is mounted, said carrier being mounted for rotation about the axis of said cylindrical surface, said chart being mounted on said cylindrical surface so that said length coordinate extends axially and said circumference coordinate extends circumferentially thereon and, means for receiving the second end of said tape means, said receiving means having a substantially cylindrical surface for taking up said tape and being coupled for rotation with said chart carrier.

28. Apparatus in accordance with claim 27 wherein said length coordinate indicating means includes means movable axially in relationship to said cylindrical surface for indicating an annular segment on said chart as the foot length coordinate value.

* * * * *